United States Patent
Rowley

(10) Patent No.: US 6,895,404 B2
(45) Date of Patent: May 17, 2005

(54) SYSTEM AND METHOD FOR ELECTRONICALLY SEARCHING FOR INFORMATION FROM A SORTED DATA SET

(75) Inventor: David John Rowley, Warrington (GB)

(73) Assignee: Fujitsu Services Limited, Slough (GB)

( * ) Notice: Subject to any disclaimer, the term of this patent is extended or adjusted under 35 U.S.C. 154(b) by 357 days.

(21) Appl. No.: 10/057,330

(22) Filed: Jan. 25, 2002

(65) Prior Publication Data

US 2002/0111944 A1 Aug. 15, 2002

(30) Foreign Application Priority Data

Feb. 9, 2001 (GB) .............................. 0103235

(51) Int. Cl.$^7$ .............................................. G06F 17/30
(52) U.S. Cl. ........................................... 707/10; 707/5
(58) Field of Search ..................... 357/1–6, 10, 104.1; 455/566; 345/810, 815, 828, 841, 845, 472, 472.1, 472.2

(56) References Cited

U.S. PATENT DOCUMENTS

| | | | |
|---|---|---|---|
| 4,104,717 A | | 8/1978 | Fujimura |
| 4,734,928 A | * | 3/1988 | Weiner et al. ............... 455/551 |
| 5,977,974 A | * | 11/1999 | Hatori et al. ............... 345/839 |
| 6,128,381 A | * | 10/2000 | Holmstrom et al. ... 379/356.01 |
| 6,697,483 B1 | * | 2/2004 | Saarinen et al. ............ 379/354 |
| 2002/0030699 A1 | * | 3/2002 | Van Ee |
| 2002/0080187 A1 | * | 6/2002 | Lawton |

FOREIGN PATENT DOCUMENTS

WO    WO 88/02147    3/1988

OTHER PUBLICATIONS

British Search Report.

* cited by examiner

Primary Examiner—Gheta Robinson
Assistant Examiner—Debbie M. Le
(74) Attorney, Agent, or Firm—Barnes & Thornburg LLP

(57) ABSTRACT

A data lookup method and apparatus enables a number of users with portable wireless devices, such as WAP phones, to conveniently access a sorted data list such as a telephone directory. The sorted list is divided into a number of sub-lists, and the user is sent information indicating the range of data in each of the sub-lists. The user then selects the sub-list that contains the required data item. The selected sub-list is then divided into a number of smaller sub-lists, allowing the user to make a further selection, and so on until the number of entries in the selected sub-list is less than or equal to the number of lines that can be conveniently displayed on the user device. The user can then select the required item. Thus, the user does not have to indicate what is being looked for, merely make selections.

9 Claims, 1 Drawing Sheet

SYSTEM AND METHOD FOR ELECTRONICALLY SEARCHING FOR INFORMATION FROM A SORTED DATA SET

This invention relates to data lookup; that is to say to methods and means for enabling a user of a computer or other electronic device to search for information from a sorted data set.

The invention is particularly, although not exclusively, concerned with a lookup method for use with devices that have a limited text-entry capability, or where there is a preference for use of a pointing device.

A common mechanism for searching for information from a sorted data set requires the user to key in the first few characters of the key field of a required item, for example a surname in a telephone directory. The user is then presented with a list of hits from which the user can make a selection. This can be time-consuming when working on a device with a limited text-entry capability, such as a WAP (Wireless Application Protocol) phone or a PDA (Personal Digital Assistant). Moreover, the number of hits returned can be uncomfortably large when common character sequences are entered. The user is then either forced to enter a larger number of characters or to page through the interim results, which can result in a large number of communications with the service providing the data. It is an object of the present invention to provide an alternative method for looking up information held in a sorted data set.

According to one aspect of the present invention, a data lookup method for enabling a user to access a data set comprises the steps:

(a) accessing a sorted list comprising the data set;

(b) dividing the list into a plurality of sub-lists, and displaying information to the user, the information indicating the range of data in each of the sub-lists;

(c) enabling the user to select one of the sub-lists;

(d) if the number of entries in the selected sub-list is larger than a predetermined threshold, going back to step (b) above with the selected sub-list in place of the list, but otherwise displaying the selected sub-list to the user and enabling the user to select a data item from that sub-list; and (e) returning the selected data item to the user.

One embodiment of the invention will now be described by way of example with reference to the accompanying drawings of which:

Figure 1:
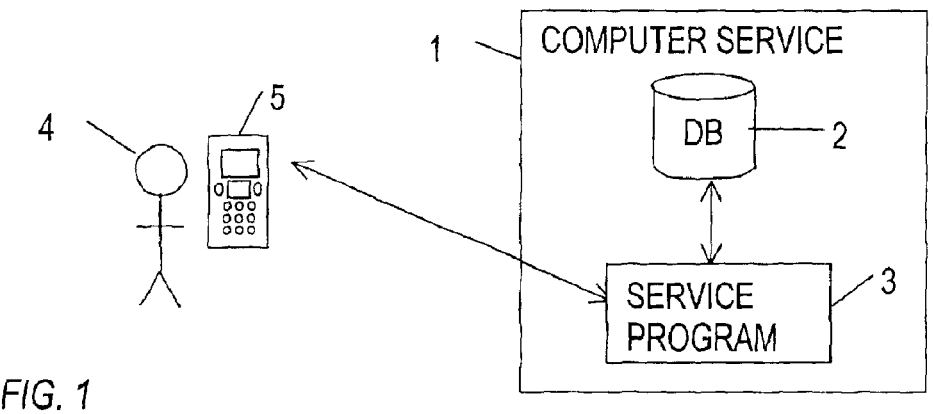
FIG. 1 is a schematic drawing illustrating a data lookup system by means of which a user can search for information in a computer service, using a hand-held unit.

FIG. 1 shows a computer service 1, holding at least one database 2. A service program 3 controls access to the database. A user 4 can access the computer service remotely, by means of a remote device 5.

The database 2 holds information that the user wishes to interrogate to obtain a single or a small number of hits. For example, the database may comprise a telephone directory, holding a list of names and telephone numbers. Additionally or alternatively, the database may hold other lists, such as staff lists or building lists.

Each information record in the database has some element or elements that can be treated as a key and is recognizable by the user. In the case of a telephone directory, the key may comprise a surname/forename combination. In other cases, the key may comprise a post code, a telephone number, a staff number, site identification etc.

Each list in the database is stored as an ordered list (e.g. as a one-dimensional array or as a linked list), in which the records are sorted in alphabetical order of their keys. Alternatively, each list may be stored in unsorted form, in which case the computer service must include means for sorting the lists when required.

The remote device 5 may be a WAP mobile phone or other data-capable phone. WAP pages are similar to pages displayed by a Web Browser, but are in text format only and with very limited functionality. Typically, such a device has a screen capable of displaying multiple lines of text, keys or other means for scrolling a cursor up and down to highlight lines of text, and a key or other means for selecting the currently highlighted line. For example, the device 5 may be a Nokia 7110 WAP mobile phone. Navigation on this device is accomplished by rotating a "Navi Roller", which highlights each selectable field in turn. Once the highlight is over the desired entry, the "Navi Roller" is pushed in to "click" on (select) it. This response is returned to the WAP server computer.

Alternatively, the remote device 5 may comprise a hand-held computing device such as a personal digital assistant, for example a Psion 5 PDA. In this case, WAP pages or simple HTML pages can be displayed and can be used for the lookup process. Navigation on this type of device is accomplished by means of a "pen" and a touch-sensitive screen. The pen acts in a similar manner to a mouse on a Windows PC. To highlight an entry on the screen the user taps once, and to select an option, the user double-taps (in the same manner as a double-click). This device can display several lines at once, so the server could be asked to send, for example, six lines each time.

Users are required to register with the computer service before they can access it. Preferably, when users register, they must supply information about their remote devices, in particular the number of lines of text that can be displayed. This information is stored by the service.

When a user accesses the computer service by way of the remote device, the user is initially presented with a menu of possible databases which can be searched; for example a telephone directory, a site directory, and so on. If the user selects one of these databases, the remote device sends a request to the service, identifying the database of interest.

Figure 2:
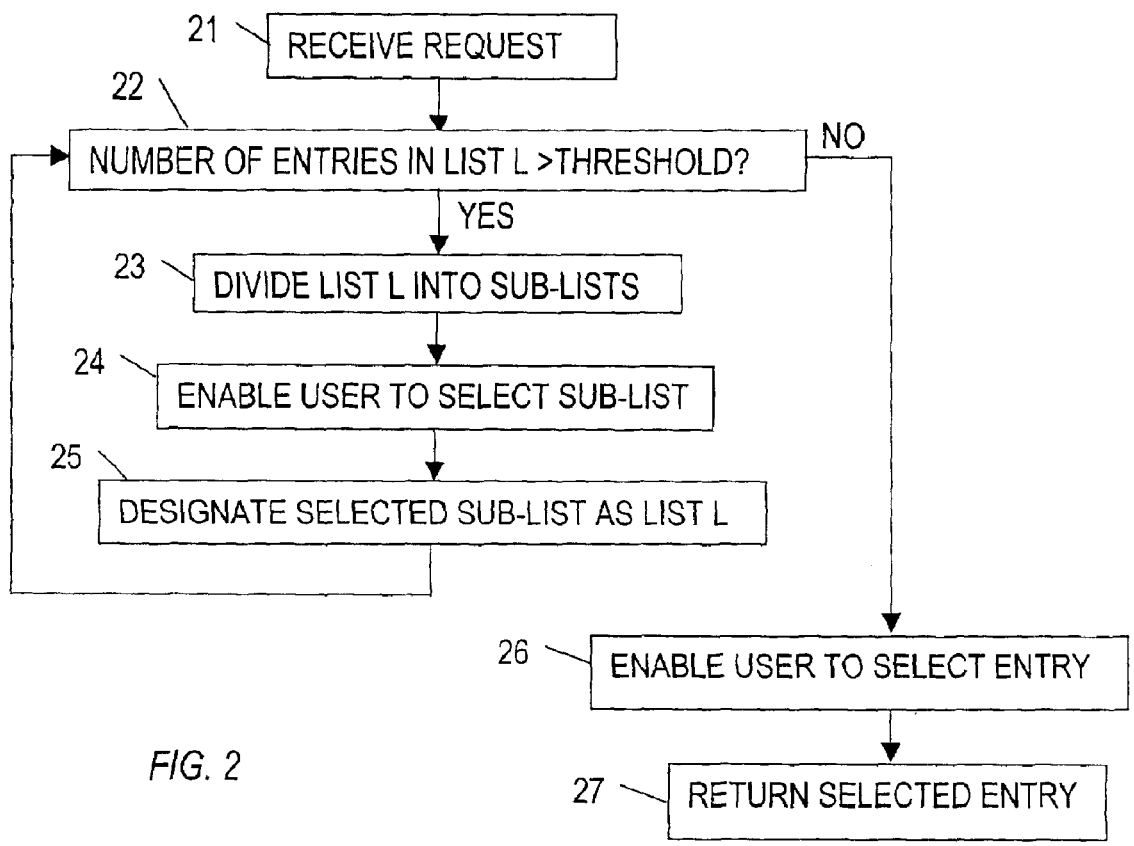
FIG. 2 is a flow chart showing the operation of the computer service in response to requests from the hand-held unit.

The operation of the computer service will now be described with reference to FIG. 2.

(Step 21) The service receives a request from a remote device, for access to a specified database. In this example, it is assumed that the database is stored as a list, sorted on a key value. The selected list is designated as list L.

(Step 22) The service determines the number of entries in list L. It then compares this number with a threshold value, equal to the number of lines of text conveniently displayable on the user's remote device. If the number of entries in the list L is equal to or lower than the threshold, the process goes to step 26 below. Otherwise, it continues with step 23.

(Step 23) The service then divides the list L into two approximately equal sub-lists (sub-list A and sub-list B).

(Step 24) The service then generates a response to the remote device. The response comprises a WAP page containing two options, corresponding to the two sub-lists. Each sub-list is identified in the WAP page by the key of the first entry in that sub-list.

When the remote device receives this response, it displays the WAP page on the device's screen. The user can then select either the first sub-list or second sub-list, using the selection keys or other selection device. The remote device then returns a response to the computer service, indicating the user's choice.

(Step 25) When the service receives the user's response, it recognises the option chosen by the user, and re-designates the selected sub-list (A or B) as list L. The process then returns to step 22 above.

It can be seen that the loop comprising steps 22–25 will be repeated, dividing the list into ever smaller sub-lists, until eventually the service recognises that a small enough number of "hits" remain for the remote device to be able to select directly from them.

(Step 26) When the service recognises that the number of entries in list L sufficiently small, it generates a WAP page containing all the entries in the list, and returns it to the remote device. Each entry is formatted with limited information, so that it can be displayed as one line of text on the remote device. If the user selects one of these entries, using the selection keys or other selection device, the remote device, the remote device returns a response to the computer service, indicating the user's choice.

(Step 27) Finally, the service responds with the complete data held on the selected entry.

It can be seen that the user can thus look up information, with minimal action on the part of the user and with minimal transfer of information between the user's device and the computer service. The user merely makes selections, and is not required to type in any details of what is being looked for.

As a simple example, suppose that a telephone directory contains just fourteen entries, with keys as follows:

BAIN, BROMIDGE, COLE, DOUGHTY, GAUL, HEARN, JONES,

LUND, MORRIS, PHILLIPS, SAKRALEN, STEELE, WALKER, YEARSLEY.

This list is sorted into alphabetic order of the keys.

It is assumed in this example that remote device can display up to four entries, and so in this case the threshold value is four. It is also assumed that the user wishes to search for HEARN.

At step 22, it is found that list L (BAIN—YEARSLEY) contains fourteen entries, and so is larger than the threshold value. At step 23, list L is divided into two equal sub-lists BAIN—JONES and LUND—YEARSLEY. At step 24, the keys BAIN and LUND are displayed on the screen of the remote device, allowing the user to select one of the two sub-lists. In this case the user will select the first sub-list, identified by the key BAIN, since HEARN comes alphabetically between BAIN and LUND. At step 25, the sub-list BAIN—JONES is redesignated as list L, and the process then loops back to step 22.

In the second time round the loop, at step 22 it is found that list L (BAIN—JONES) contains seven entries, and so is still larger than the threshold value. At step 23, list L is divided into two approximately equal sub-lists BAIN—DOUGHTY and GAUL—JONES. At step 24, the user selects the second sub-list, identified by the key GAUL. At step 25, the sub-list GAUL—JONES is redesignated as list L, and the process then loops back to step 22.

In the third time round the loop, at step 22 it is found that list L contains just three entries: GAUL, HEARN and JONES. This is smaller than the threshold value, and so the loop exits to step 26. All three entries are presented to the user, allowing the user to select the desired entry.

The nature of the method means that there is no requirement for the computer service to hold "state" information about enquiring users or their position in the process; each communication pair is complete in itself and each response to the device contains information that the computer service will use to process the reply from the device. However, in other embodiments of the invention, state information may be retained between stages in the process if wished and if practical.

The method is also applicable to devices which do have a full text-entry capability, but where the user prefers to use a pointing device to select items, for example a Windows PC with a mouse.

Whereas in the above the lists are divided into two sub-lists at each stage, it would be possible to increase the number of sub-lists at each stage, provided the users' device can accommodate them. For example the service could split the complete list into four sub-lists at each stage, which would significantly reduce the number of interactions (communications) between the device and the service. For example, a list of 65536 items can be searched with a maximum of 16 interactions by splitting the list into two sub-lists at each stage. If the list were divided into four sub-lists at each stage, the maximum number of interactions would be reduced to 8.

It will be appreciated that many other modifications may be made to the apparatus and method as described above without departing from the scope of the present invention as defined by the appended claims.

What is claimed is:

1. A data lookup method for enabling a user to access a data set by way of a remote device, the method comprising the steps:

(a) storing the data set at a server as a sorted list;

(b) operating the server to divide the list into a plurality of sub-lists, and to transmit information to the remote device, the information indicating the range of data in each of the sub-lists;

(c) when the information is received at the remote device, operating the remote device to display the information to the user enabling the user to select one of the sub-lists, and to transmit a message to the server, the message indicating the selected sub-list;

(d) when the message is received at the server, if the number of entries in the selected sub-list is larger than a predetermined threshold, operating the server to go back to step (b) above with the selected sub-list in place of the list, but otherwise, if the number of entries in the selected sub-list is not larger than the predetermined threshold, operating the server to transmit further information to the remote device, said further information indicating the data items in the selected sub-list (e) when the further information is received by the remote device, operating the remote device to enable the user to select one of said data items, and to transmit a further message to the server, indicating the selected data item; and (f) when the further message is received at the server, operating the server to return the selected data item to the user.

2. A method according to claim 1 wherein the remote device comprises a portable wireless device.

3. A method according to claim 2 wherein the portable wireless device comprises a WAP (Wireless Application Protocol) phone.

4. A method according to claim 2 wherein the portable wireless devices comprises a PDA (Personal Digital Assistant).

5. A method according to claim 2 wherein the threshold is equal to the number of lines of text that can be displayed on the portable wireless device.

6. A method according to claim 1 wherein the step of dividing the list into a plurality of sub-lists comprises dividing the list into two sub-lists.

7. A method according to claim 1 wherein the step of dividing the list into a plurality of sub-lists comprises dividing the list into four sub-lists.

8. A method according to claim 1 wherein each entry in the list includes a key value, and wherein the information indicating the range of data in each of the sub-lists comprises the key value of the first entry in each of the sub-lists.

9. A server for providing a data lookup service, the server comprising a database holding a data set, communication means for communicating with at least one user device, and processing means for performing the following steps:

(a) accessing the data set as a sorted list;
(b) dividing the list into a plurality of sub-lists, and transmitting information to the user device, the information indicating the range of data in each of the sub-lists;
(c) receiving a message from the user device indicating that the user has selected one of the sub-lists;
(d) if the number of entries in the selected sub-list is larger than a predetermined threshold, going back to step (b) above with the selected sub-list in place of the list, but otherwise transmitting further information to the user device, the further information indicating the data items in the selected sub-list;
(e) in response to a message from the user device indicating selection of a data item from the sub-list, transmitting the selected data item to the user.

* * * * *